B. P. DOTTERER.
AUTOMATIC SCALE.
APPLICATION FILED OCT. 17, 1917.

1,274,521.

Patented Aug. 6, 1918.
4 SHEETS—SHEET 2.

WITNESSES
H. Woodard

INVENTOR
B. P. Dotterer
BY
ATTORNEYS

B. P. DOTTERER.
AUTOMATIC SCALE.
APPLICATION FILED OCT. 17, 1917.

1,274,521.

Patented Aug. 6, 1918.
4 SHEETS—SHEET 3.

WITNESSES
H. Woodard

Inventor
B. P. Dotterer
By Munn & Co.
Attorneys

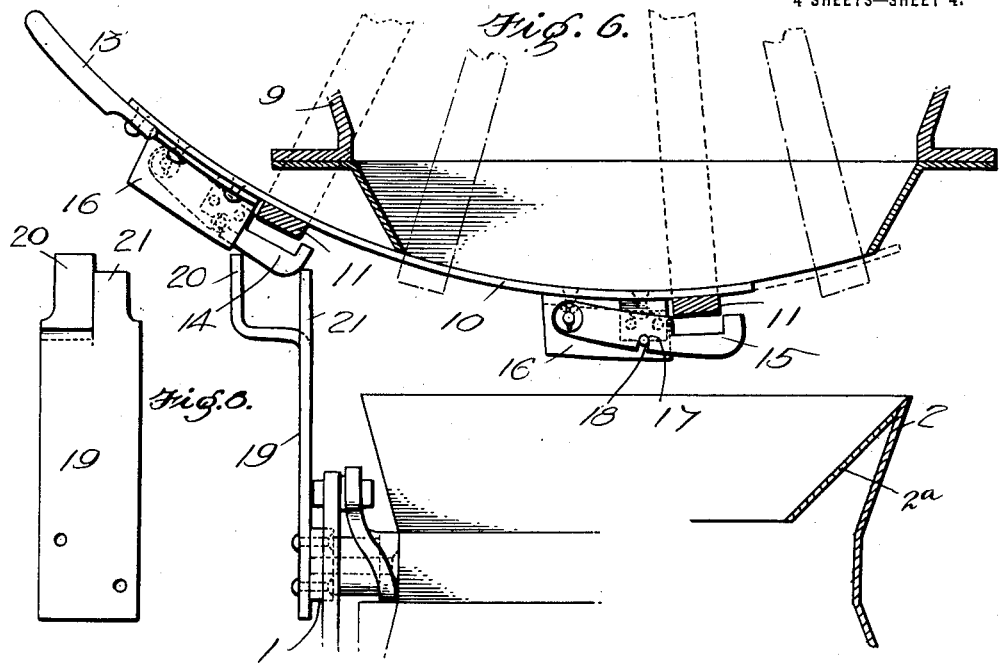
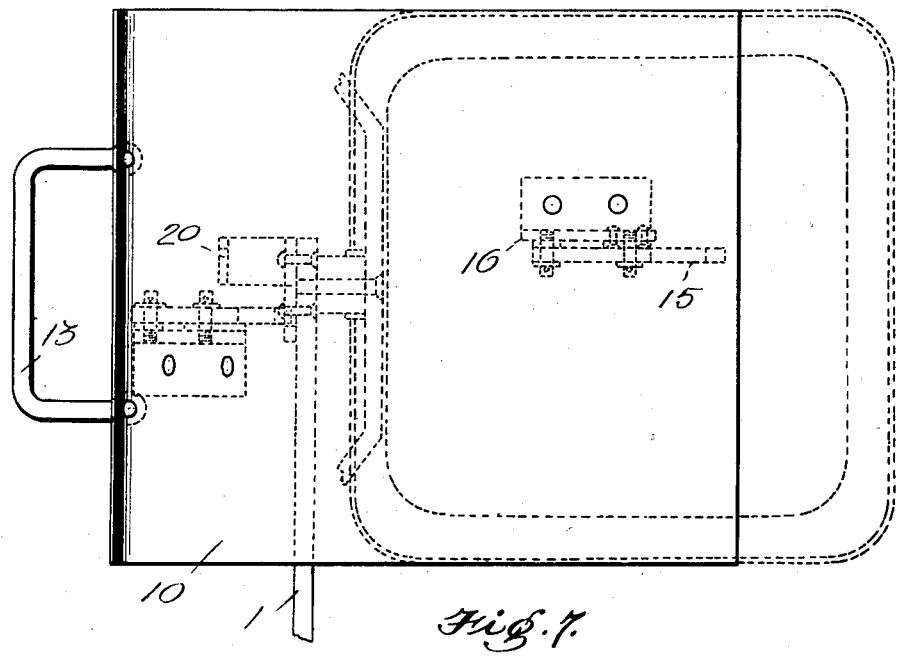

UNITED STATES PATENT OFFICE.

BENJAMIN PICQUET DOTTERER, OF CHARLESTON, SOUTH CAROLINA.

AUTOMATIC SCALE.

1,274,521.            Specification of Letters Patent.        Patented Aug. 6, 1918.

Application filed October 17, 1917. Serial No. 197,053.

*To all whom it may concern:*

Be it known that I, BENJAMIN P. DOTTERER, a citizen of the United States, and a resident of Charleston, in the county of Charleston and State of South Carolina, have invented new and useful Improvements in Automatic Scales, of which the following is a specification.

My invention is an improvement in automatic scales, and has for its object to provide mechanism in connection with a scale of the character specified and for use with a gravity discharge, having a gate or door normally moved into closed position, wherein means is provided operated by the scale as it is depressed by the load for tripping the gate or door holding mechanism to release the same when the predetermined weight is almost reached to permit the gate or door to partially close and for afterward tripping the releasing mechanism to permit the gate to completely close when the predetermined weight is reached.

In the drawings:

Fig. 5 is a bottom plan view, but one half being shown;

Fig. 6 is a sectional view showing the tripping means;

Fig. 7 is a top plan view thereof; and

Fig. 8 is a detail side view of the tripping arm.

Figure 1:
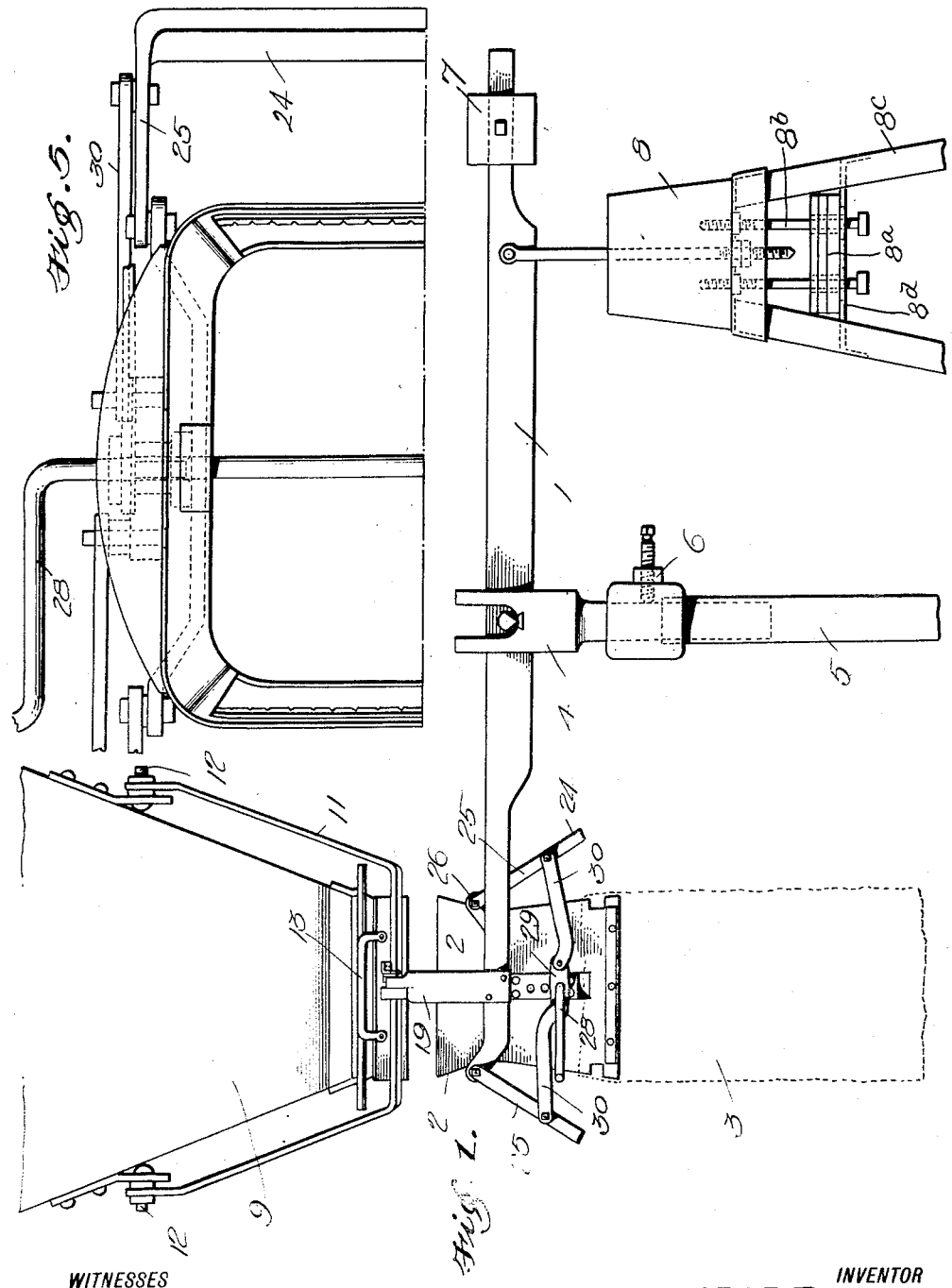
Figure 1 is a side view.
Figure 2:
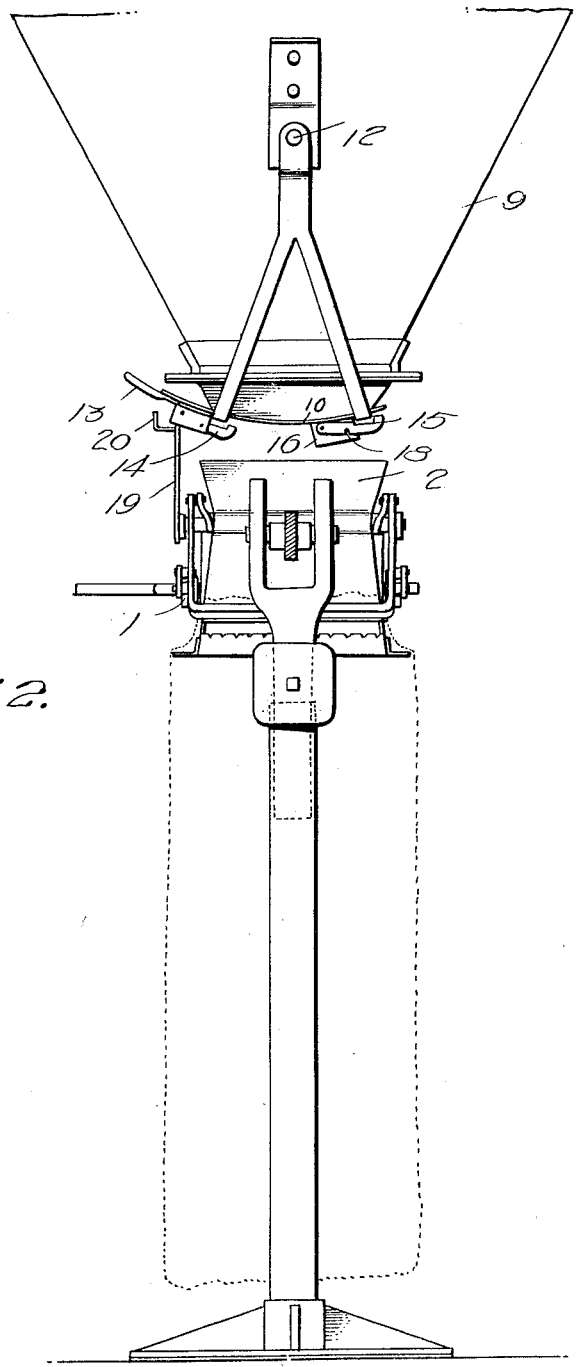
Fig. 2 is an edge view of Fig. 1.

The present embodiment of the invention is shown in connection with an automatic scale of the usual construction, the scale comprising a beam 1 which is forked at one end, and the arms of the fork engage opposite sides of the chute 2 which is arranged beneath the discharge spout and which carries the bag 3. This beam is supported by a knife bearing in a fork 4 which is adjustably connected with the standard 5 by mechanism indicated at 6, and weights 7 and 8 are connected with the beam at the opposite end from the chute. The weight 7 balances the chute and connections, while the weights 8—8ᵃ depend upon the amount to be entered in the bag.

The gravity discharge spout 9 is provided with a curved or arc shaped gate 10 for closing the lower discharge end thereof, and this gate is supported by yokes 11 which are pivoted to the discharge spout, as indicated at 12, in such manner that the gate may be swung into open or closed position, and the gate is opened by means of a handle 13 connected therewith. The gate is held in open or partially open position by means of latches 14 and 15, the said latches being similar and being pivoted to angle plates 16 secured to the gate. Each of the latches normally stands in the position of Fig. 6 by gravity, and each latch has a notch 17 in its lower edge intermediate its ends, and the notch is adapted to engage a seat 18 on the adjacent plate 16 to limit the downward movement of the latch to the position shown in Fig. 6. The latches are notched in their upper faces to fit over the bodies of the yoke 11. A stop plate 19 is pivoted to one of the arms of the fork of the scale beam, and the upper end of this stop plate is split, and one of the portions 20 at the split is offset laterally with respect to the body of the plate. This portion 20 is not only offset laterally with respect to the other portion 21 but is also offset to one side, that is, in the plane of the plate, and the said portion 20 is of greater length than the portion 21. These portions 21 and 20 are adapted for engagement by the latches 14 and 15, respectively, to hold the gate in open and partly open positions.

When the scale is empty, that is, when an empty bag is connected with the chute, the chute is in lifted position, and when the gate is open the latch 15 will engage the stop 21 to hold the gate completely open. When the chute begins to move downwardly under the influence of the increasing weight of the bag, that is, when the bag is from ninety to ninety-five per cent. filled, the stop plate moving down with the chute will move the said stop 21 out of the path of movement of the latch 15, and the gate will partially close, moving toward closed position until the latch 14 engages the stop 20. The latch 14 will catch and hold until the complete downward movement of the chute releases the said latch, after which the gate will close completely. In practice, it may be necessary to place something in the chute to retard the progress of the material into the bag, to slow the action of the chute in its downward movement.

Figure 3:
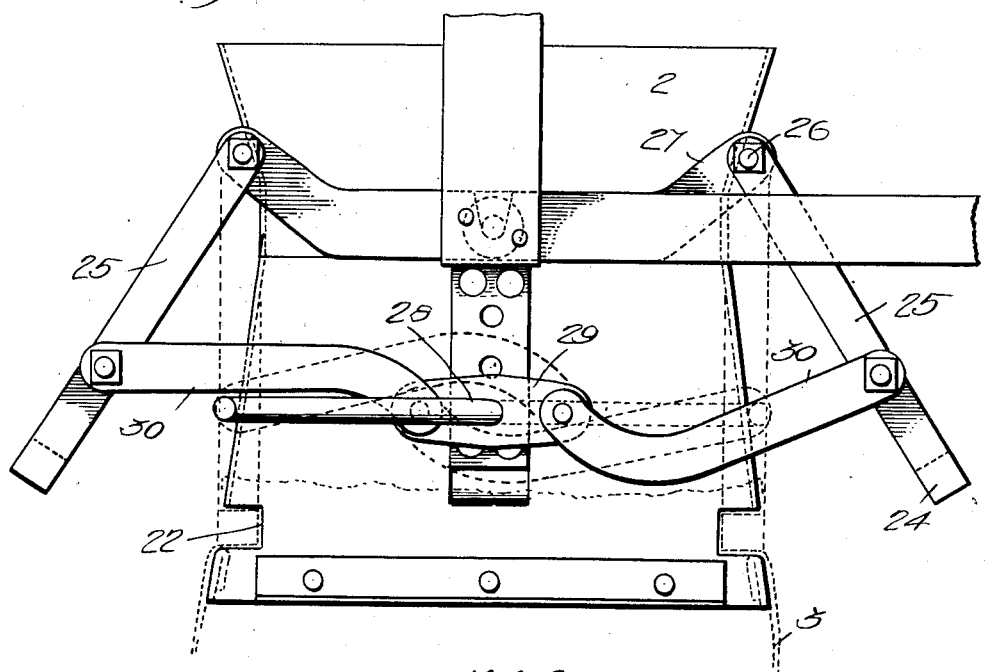
Fig. 3 is an enlarged side view of the bag clamping means.
Figure 4:
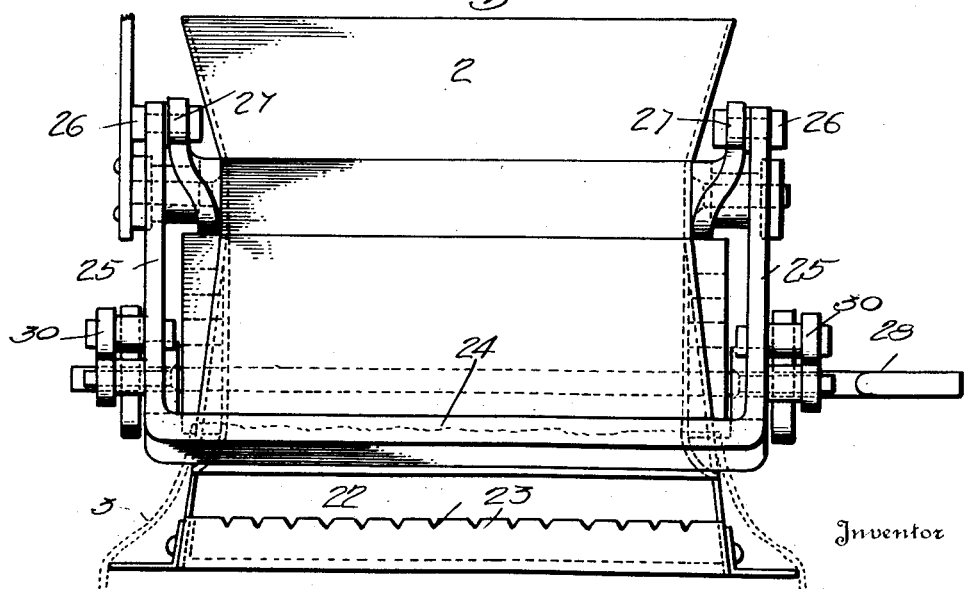
Fig. 4 is an enlarged edge view thereof.

The bags 3 are held to the bottom of the chute by the mechanism shown more particularly in Figs. 3 and 4. It will be noticed that at its lower end the chute 2 has slots 22 at opposite sides and that the lower walls of the slots are notched, as shown at 23. The edges of the bag are passed through these slots as shown in Fig. 3, and are clamped in place by clamping bars 24, which are the bodies of yokes comprising the said bars and arms 25 which are pivoted at 26, the pivotal connection of the arms being to brackets 27 on the chute. These yokes are swung inwardly and outwardly by means of a crank 28 which is journaled transversely of the chute and has secured to the ends thereof cross heads 29. Links 30 connect the ends of the cross heads with the arms of the yokes in such manner that when the shaft is oscillated in one direction the yokes will be swung inwardly and when they are oscillated in the opposite direction they will be swung outwardly. When the yokes are swung inwardly they clamp the material of the bag within the slots and hold it firmly in place.

In operation, the empty bag being attached, the parts will be in the position of Fig. 1. The gate is now opened, by means of the handle 13, and the material begins to pour through the chute into the bag. When the bag is ninety to ninety-five per cent. full the beam will begin to swing down and the stop 21 will release the latch 15. The gate will swing into the partially closed position of Fig. 6, and will so remain until the entire predetermined weight is in the bag, when the downward movement of the bag and chute will release the latch plate 15, permitting the gate to fully close.

It will be noticed from an inspection of Fig. 3 that the fork arms of the scale beam have notches in their upper edges for receiving pins on the chute to pivotally connect the chute to the arms.

Referring to Fig. 1, it will be noticed that the weight 8 which normally rests upon the stand 8ᶜ has connected therewith downwardly extending bolts 8ᵇ, and small weights, indicated at 8ᵃ, are slidable on these bolts. These weights, when the scale is in the position of Fig. 1, rest upon a shelf 8ᵈ, and the heads of the bolts are below the weights so that the weight 8 must move upwardly some distance before the weights 8ᵃ will begin to move. These are pick-up weights and are intended to retard the action of the chute. When the scale moves down under the weight of the bag, the weight 8 will not lift until the bag is approximately ninety to ninety-five per cent. full. As soon as the weight 8 moves upwardly far enough, the weights 8ᵃ will be picked up and the downward movement of the chute will be retarded. A further retardation is brought about by the construction of the chute, that side wall of the chute remote from the elements 19, 20, 21 being inclined sharply inward, as indicated at 2ᵃ, so that when the gate is partly closed the material pouring into the chute will strike the inclined wall, thus falling directly into the bag.

I claim:

1. In combination, a scale having a chute, means in connection with the chute for clamping a bag to the chute below the same, a gravity discharge spout delivering to the chute, a gate for closing the spout, latches in connection with the gate for holding said gate completely open and partially opened and normally gravity operated to engaging position, and means on the scale for engagement by the latches to hold the gate open when the chute is in lifted position and released by the lowering of the chute under the weight of the material delivered to the bag, said means comprising a stop plate secured to the scale at the chute and having stops for engagement by the latches to hold the gate in full and partly open position.

2. In combination, a scale having a chute, means in connection with the chute for clamping the bag to the chute below the same, a gravity discharge spout delivering to the chute, a gate for closing the spout, latches in connection with the gate for holding said gate completely open and partially open and normally gravity operated to release position, and means on the scale for engagement by the latches to hold the gate in open position when the chute is in lifted position and released by the lowering of the chute under the weight of the material delivered to the bag.

3. In combination, a scale having a chute, a gravity discharge spout delivering to the chute, a gate for closing the spout, means normally moved to engaging position for holding the gate completely open, means normally moved to engaging position for holding the gate partially open, and means on the chute for engaging the said means to release the same when the chute descends.

4. In combination, a scale, a spout delivering to the scale, means normally moved into closed position for closing the spout, releasable means for holding the spout open and partially open, each of said means being normally moved into released position, and means in connection with the scale for holding one of the said means in operative position when the scale is in empty position and for holding the other in operative position when the scale has a predetermined portion of its load.

BENJAMIN PICQUET DOTTERER.